United States Patent [19]
Berger et al.

[11] 3,743,823
[45] July 3, 1973

[54] FEEDBACK CONTROL SYSTEM WITH DIGITAL CONTROL ELEMENTS

[75] Inventors: Hans-Jürgen Berger; Hans-Wilhelm Usedom, both of Bremen; Horst Michaelis, Delmenhorst, all of Germany

[73] Assignee: Vereinigte Flugtechnische Werke-Fokker GmbH, Bremen, Germany

[22] Filed: June 15, 1971

[21] Appl. No.: 153,255

[30] Foreign Application Priority Data
June 23, 1970 Germany............... P 20 30 739.5

[52] U.S. Cl........................ 235/150.1, 235/150.22
[51] Int. Cl. ........................................... G05d 15/00
[58] Field of Search...................... 444/1; 235/150.1

[56] References Cited
UNITED STATES PATENTS
3,564,222  2/1971  Di Paolo ...................... 235/152 IE Primary Examiner—Eugene G. Botz
Attorney—Smyth, Roston & Pavitt

[57] ABSTRACT

A feedback control system having a digital steering controller connected to be directly responsive to a command signal and to at least one other input signal, and providing a train of first output signals received by a simulator, constructed for simulating operation and response of a controlled system. At least one output signal of the simulator is the other input signal of the steering controller, and is additionally fed to a digital error controller together with an output signal of the controlled system, that corresponds functionally to the output signal of the simulator. The digital error controller forms an error signal and provides an output that is combined with the output of the steering controller and fed to the controlled system.

8 Claims, 2 Drawing Figures

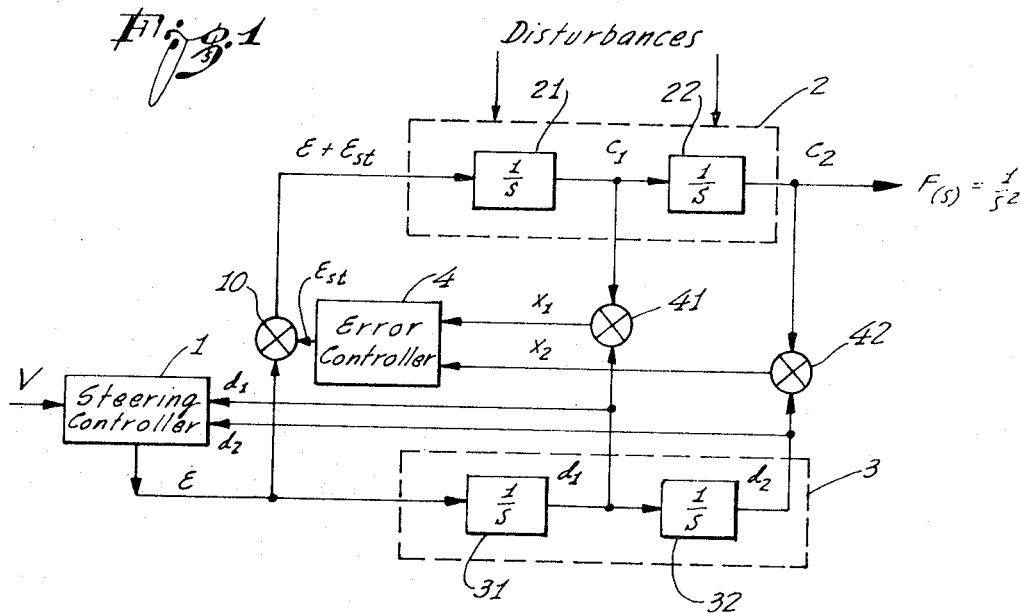
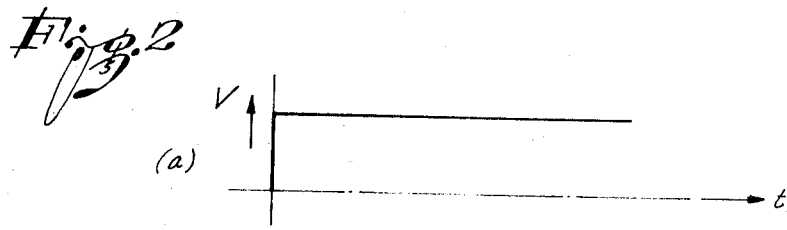
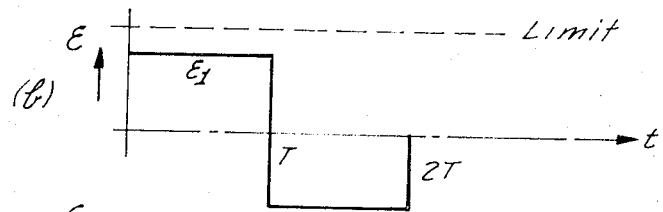
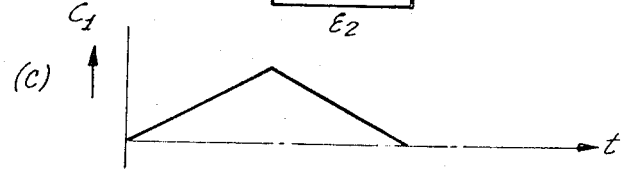
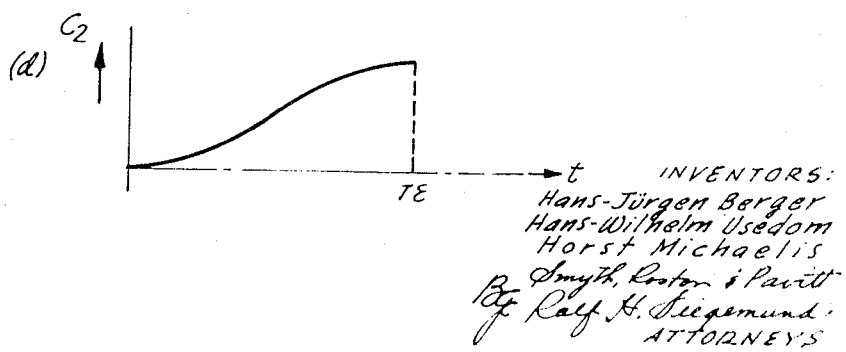

FEEDBACK CONTROL SYSTEM WITH DIGITAL CONTROL ELEMENTS

The present invention relates to a feedback control system, using system components which provide digital operation, particularly in response to a command input, for digitally developing control signal that is to act on an actuator for obtaining the desired control and actuator operation.

Upon using digital techniques within feedback systems, it is usual to sample the controlled variable and other relevent variables within the controlled system and to feed these sampled values to a digital computer that is part of the control apparatus. The digital controller is designed to realize an algorithm and computes output signals from the input it receives. The digital controller receives also a command signal in digital or an analog form whereby in some cases an error signal is produced either through analog techniqes, being digitized subsequently, or the error signal itself is produced digitally.

Usually, the output signal will be updated in steps and is passed to the controlled system. Each output signal is held at particular level until updated by the next computing step. This output signal, which can also be called a manipulated variable, operates immediately upon an actuator within the control system to change condition and operating state of the controlled system in response to the manipulated variable as computed.

The processing of the controlled variables and, possibly, of other signals derived from the controlled system in conjunction with digital processing of command signals, requires considereation of the time response of the controlled system. The algorithm realized in the digital controller takes that temporal behavior into consideration, but on the other hand there exists an unknown, generally, nonlinear function as between the command input and the manipulated variable as produced on basis of that algorithm on one hand, and the resulting controlled variable on the other hand. That is not to say that the behavior of the controlled plant is completely unknown, but amplitude and duration of disturbances are unknown. This is the disadvantage, among others, that a feedback loop with a particular algorithm, as realized by the digital controller, provides for optimum response and settling of the controlled plant only, e.g., for large or for small command signals; due to the nonlinearity in the behavior of the control system differently proportioned command signals find a less favorable response and result.

Additionally, it has to be considered that the updating of the calculated control signal occurs basically at arbitrarily chosen intervals, so that the computed signal amplitude has actually a certain inherent random feature. The period of updating can be varied within certain limits, and for each such variation there will be computed a different manipulated variable, basically to obtain the same result. But each train of control signals, so provided, does not necessarily represent a sequence of signals in which the effect of this manipulated variable is optimized, and that, in turn, causes usually a higher power requirement for the operated actuator to maintain operation within prescribed tolerance limits. Another disadvantage inherent in the known digital feedback systems is that the transfer characteristics of the controlled system has to be known rather accurately so that the algorithm realized in the digital controller can be determined with sufficient accuracy as that, in turn, determines the accuracy of the feedback system as a whole.

It is an object of the present invention to avoid the aforesaid disadvantages and to provide a basically novel system for digital feedback control In accordance with the preferred embodiment of the present invention, control elements are divided into two basic system components. One is a steering controller, responding directly to the command input but not to the controlled variable, the other one is a disturbance or error controller, responding directly to the controlled variable, but not to the external command. Operation of the controlled system and plant is duplicated in a simulator which is controlled by the steering controller in parallel to operation provided to the controlled system. Corresponding variables, including the controlled variable, are derived from the controlled system as well as from the simulator and are negatively superimposed in summing points to produce error signals that operate a calculator of the error controller. The output of the error calculator and controller is superimposed upon the output of the steering controller to be effective as manipulated variable in the controlled system. The algorithm realized in the steering controller considers any desired dependency between response time of the control and actuator elements, and the command signal proper. The output of the simulator as fed to the steering controller, establishes a particular loop to provide an idealized manipulated variable as an output that would be completely correct if (a), there were no disturbances, and (b) the simulator duplicates the controlled system completely. This output of the steering controller can be optimized on basis of the known simulator operation so that this output (as one contributing component for the manipulated variable) tends to minimize the power requirements for control and actuating operation. The disturbance or error controller establishes merely control operation in which randomly occuring, unforeseeable disturbances are eliminated to the extent that they cause the controlled variable to deviate from amplitude that would be present without such disturbances.

As a consequence of this provision, it appears that the transfer function of the controlled system does not have to be known very accurately. In other words, the simulation need only be an approximate one, and the resulting differences can be regarded as indirectly simulated disturbances, which will be eliminated by the error controller and calculator. Reasonably, the deviation should not exceed certain limits, i.e., for practical reasons, the simulated or pseudo disturbances should not be larger than actual disturbances.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates a block diagram of an example for the preferred embodiment of the present invention; and FIG. 2 has graphs a, b, c and d, illustrating signal behavior in dependence upon time in the system of FIG. 1.

Turning to details of FIG. 1, there is shown a system or plant 2 that includes, for example, a control element and actuator 21, operating a controlled device 22. The device 22 may, for example, be part of the control apparatus for a vertical takeoff aircraft during hovering phase. $C_2$ is, or represents, the controlled variable proper (see FIG. 2d), $C_1$ is, or represents, an intermediate variable and represents, for example, the actuator output (see FIG. 2c). The signals $C_1$ and $C_2$ may be derived from plant 2 via suitable transducers, and are assumed to have low signal level to be used under minimum load conditions.

The symbol $1/s$ represents the Laplace transform of the transfer function in each of these devices, $F(s)$ is the Laplace transform of the composite function of the plants. Signals $C_1$ and $C_2$ are the feedback signals of the plant, there could be more in a more complex system. In many instances, it is desirable and practical, to provide the feedback system with plural feedback loops for reasons of enhancing the stability, increasing response, control of loop gain, etc. Thus, it will be readily apparent, that the number feedback signals could be $n$, with $n$ being a positive integer, and the various considerations below are equally applicable, and they do not depend on any particular number of variables processed.

The control system has a primary input, which is a command signal V, fed as command input to a steering controller 1. The steering controller can be of conventional design and as used as minicomputers as disclosed, for example, in U.S. Letters Patent No. 3,564,222 (also German printed Pat. application No. 1,933,164, published Jan. 15, 1970). Such a computer includes an adder with carry logic, registers for immediate cooperation with the adder, often called accumulators, and additional storage facilities for program control and data to be used in the calculators. The program control provides for calculations of dependent variables in response to inputs (sensors) under utilization of constants. The calculators involve basically addition/subtraction and multiplications, the latter being a composite operation of plural additions. Presently, the steering controller computes a dependent variable E by arithmetically processing inputs V, $d1$ and $d2$. It is basically arbitrary whether that signal V is an analog signal or a digital signal (FIG. 2a shows an analog representation which is not necessarily the signal form!) In the preferred form it may be assumed that signal V is a digital signal applied to that input of steering controller 1, either as a sequence of signals at predetermined clock pulse time, and in serial by bit or in parallel by bit format, but always, of course, in a serial by character format, one character representing one command value amplitude. Particularly in case of a parallel-by-bit format, the signals may be maintained at the input in a sample and hole configuration to change more or less at random times whenever a change is needed or called for the source for the command signal. The same holds true, if the command signal is presented as analog signal to be digitized as part of the input operation of the controller 1.

In a typical example, signal V may be derived from a digitizer or it may be derived, for example, from a control tape or any other progressively scanned storage facility, or the like. The presentation of command signal is preferably synchronized with the operation of the calculator that is included in controller 1. The controller 1 may include stages that convert the command signal into a reference signal for further operation and utilization accordingly. The U.S. Pat. No. 3,564,222 mentioned above, discloses specifically how to introduce external variable into a computer/calculator for immediate participation in the calculations to be performed.

The controller 1 includes conventional digital elements for processing digitally the signal train V or a digital representation thereof. The processing will include further input signals which will be described shortly. The controller 1 produces a manipulated variable or output signal, generally denoted E, again either in a digital configuration, but it may be assumed presently that signal E is an analog signal. The signal E is provided in step function fashion, varying its amplitude in steps that occur at a predetermined or calculated rate. The signal level is sustained until updated by a new calculation, whereupon the signal level changes, preferably at steep rise or fall times (see FIG. 2b).

The signal train E is fed first to a simulator 3. The similulator 3 simulates operation of controlled system 2, possibly in a more or less approximated and somewhat idealized or simplified form. In the particular example, simulator 3 includes a first circuit network 31 that simulates operation of actuator 21 in that, for similar inputs of each, similar outputs are produced. Of course, network 31 is not an element that is constructed similar to actuator 21, rather, it is composed of low power, e.g., electronic components, resistors, diodes etc., producing an output $d1$, whose temporal behavior follows and duplicates that of signal $C_1$.

Analogously, there is a second network 32, simulating operation of controlled device 22, but without the power requirements of the latter, i.e., operation itself is not duplicated. The simulator output signal $d2$ is, thus, similar to controlled variable $C_2$ under similar conditions, i.e., in the absence of unforeseen disturbances. The simulator 3 may additionally be subject to variations corresponding to foreseeable and detactable disturbances that may act on plant 2.

In any event, for each input signal E, simulator 3 provides a plurality of simulation outputs, which are the simulated controlled variables $d1$ and $d2$. In case more variables are extracted from plant 2, correspondingly more are produced by the simulator. As stated, simulation may be carried out by simple linear and nonlinear circuit elements. Alternatively, the computing facility used by sterring controller 1 may be time-sheared, so that the simulation is based on an algorithm, and signals $d1$, $d2$, etc. are calculated accordingly.

Significantly though, simulator 3 provides inherently a replica of the (assumed) response time TE of the plant, but there may be deviation particularly in case the response TE is amplitude dependent.

The simulated outputs $d1$, $d2$ and others, if any, are passed first to the steering controller 1 as input signals. Signal $d2$ is the simulated controlled variable and will be processed in and by sterring controller 1 in conjunction with command signal V to obtain an initial error signal proper of the system. Signal $d1$ is processed with the error signal to calculate the signal train E. The algorithm in controller 1 uses signal $d$ as initial conditions to calculate a signal train Ev, varying in steps at fixed or calculated intervals T (see FIG. 2b). It is, however, optional to sample signals $d$ for operation in controller 1 in the beginning of a period TE only, when command input V has changed level. Alternatively, the variations in signal $d$ during the response period TE could be used for updating calculations in controller 1. However, this updating function may actually be carried out by an error controller 4, responding to the temporal behavior of plant and simulator after control has begun.

A set of summing points 41 and 42 is provided for respectively comparing signals $C_1$ and $C_2$ with simulated signals $d1$ and $d2$, and providing the simulation error signals X1 and X2. These signals represent the deviation between actual response of the controlled system 2 from the simulated response, for example, because of additional disturbances that act on the controlled plant but not on simulator 3. Also, there may be a slight deviation between a somewhat simplified simulation and actual behavior giving rise to the above defined simulated disturbances.

The signals X1 and X2 may be represented in digital or in analog form, but they are needed in digital form. Typically, signals $C_1$ and $C_2$, representing intermediate and controlled variables of a controlled system, are analog signals but they may have been digitized already, where extracted and developed. This is a matter of instrumentation and of practicality of implementation. It may be practical to operate that part of the system with analog techniques and to digitize the error signals X1 and X2. Summing points 41 and 42 may, thus, include analog to digital converters.

The signals X1 and X2 are fed to the error calculator 4 which is also a digital computing device (or is time-shared with the calculator used in controller 1). Elements 4, 41 and 42 can be regarded as the error or disturbance controller, having as principle function to offset deviations between real (2) and simulated (3) behavior of the overall system. Calculator 4 provides a digital control signal in response to each group of error signals (X3, X2) as applied. The error controller can be of the same design as the steering controller, and will differ only as to the artithmetic computing program that is carried out, but involves the same basic computing steps of addition/subtraction and multiplication. The digital output of calculator 4 is converted into an analog signal Est which is superimposed upon the signal E in a summing point 10. The combined signal E + Est is fed to the actuator 21 of the controlled system 2, but not to the simulator 3 as its idealized behavior is not to be disturbed by the true behavior of the plant. The simulator output, therefor, serves as reference for and in the loop 2 → 4 → 10 → 2.

The system, in accordance with the invention, requires only minimum power as the sequence of control signals E and Est is and remains rectangular. The steering controller 1 operates in accordance with an algorithm that is adapted to the particular controlled system 2. In particular, the steering controller provides, for each command signal V, a train of signals E within the assumed response period TE. The signals $d1$ and $d2$ serve as initial conditions to calculate signal train Ev- ($E_1$, $E_2$) for causing the controlled variable $C_2$ to assume a new value within the response and settling time TE of plant 2. Concurrently thereto, the disturbance or error controller 4 offsets deviations in temporal behavior between system components 2 and 3, so that the former will settle in shortest possible time without excess power.

The response time TE is a freely selectable parameter for the calculations and for operation by the simulator 3, and the signals $d1$ and $d2$ are sampled for the steering controller at a rate that is equal to this response time TE. The signals E of the train are presented in steps of duration T, whereby a group of signals Ev is presented for each response period TE. The number of these signals per group must be at least equal to the order of the differential equation that describes the controlled system 2 and is duplicated by simulator 3. The duration T of each signal Ev has influence upon the control operation in that the number of control steps times that duration should equal the response time TE. In the present instance, a second order differential equation was assumed.

In the specific example illustrated, it is assumed that the command signal V has jumped by a particular value at an arbitrarily chosen time zero. The signals $C_1$ and $C_2$ were assumed at an quiescant level at that time, and simulator signals $d1$ and $d2$ will have analogous values. The latter two signals particularly, will provide the initial conditions carried out promptly in the calculator of steering controller 1 on basis of the new command,using the assumed response period TE (settling time for $C_2$ to approximately stabilize at the new level corresponding to the new command). The calculator in controller 1 calculates a first signal level $E_1$ to last for about half the period TE, which, if persisting, would result in an excessive value for the variable $C_2$. Therefor, for about an equal period thereafter controller 1 calculates and provides an opposing signal $E_2$, so that the two signals $E_1$ and $E_2$ in operative combination cause signal $C_2$ to approach the desired new level at the end of period TE.

These operations are based on a second order differential equation for describing plant 2. Concurrently, signals d1 and d2, which simulate approximately the assumed response and characteristics of $C_1$ and $C_2$, are compared in negative summing points 41 and 42 with the latter signals, and digitized error signals X1 and X2 are processed by calculator 4 so as to obtain a corrective signal Est that is superimposed upon E generally and is effective also in the input of actuator 21. The input signals for the calculator 4 may be sampled, for example, at time T, so that Est is provided only thereafter to be superimposed upon $E_2$, and another control signal Est may be calculated at 2T ($\approx$ TE) to provide particular control for correcting any residual error that may have been caused by disturbances in the meantime.

The signals $E_1$, $E_2$, as sequentially fed to the controlled system 2 as well as to the simulator 3, have their amplitude calculated by controller 1 to minimize the power requirements of the system for the plant to assume the desired operational state, wherein signal $C_2$ has value at the end of TE as determined by command input V at the beginning of TE. The algorithm realized in steering controller 1 may actually provide for a larger number of steps and more than two different signals Ev per response period TE are provided. The amplitude of each signal Ev will differ in this case accordingly. This mode of operation will particularly occur in case controller 1 has calculated, or a caculation has lead to an exceeding of the operational limit (maximum permissible input for the actuator 21, see FIG. 2b). In this case, the calculator portion within controller 1 will calculate the smallest possible response time and the smallest number of updating steps for the respective group of signals Ev, for each to remain within limit. The actuator 21, within the controlled system 2, is then controlled accordingly.

The error controller 4 does not just calculate the supplemental manipulated variable Est in response to true external disturbances, but, in addition, compensates errors resulting from deviation between the assumed time response TE of simulator 3, made part of the algorithm in steering controller 1, and the true, but partially unknown time response of the controlled system.

It will be realized that in the steady state with command V having remained constant for longer than the response period TE, the simulation should be sufficiently accurate so that signal $d1$, $d2$, $do$ represent signals $C_1$, $C_2$, and the desired levels. The steering controller will then remain in a quiescent operating state. Subsequent disturbances will cause error controller 4 to respond so as to provide feedback control operation in form of a corrective signal E$est$. The error calculator 4 may operate independently from controller 1, sampling, for example, signals C and $d$ more frequently.

The invention is not limited to the embodiments described above but all changes and modifications thereof not constituting departures from the spirit and scope of the invention are intended to be included.

We claim:

1. Feedback control system for the control of a controlled system that includes an actuator, the control system operating in response to a variable command signal, the controlled system having an input signal, the system comprising:
    a digital, steering controller connected to be directly responsive to the command signal and further connected for being responsive to at least one first feedback signal, the steering controller providing calculations and presenting a train of first output signals representative thereof, the first output signal having value for causing the controlled system to follow the command signal;
    first means contructed for simulating operation and response of the controlled system to signals when applied to said input, and having an input, analogous to the input of the controlled system, for receiving the train of first output signals and providing at least one, second output signal, the first means connected to feed the second output signal as the first input signal to the steering controller;
    second means for deriving at least one third output signal from the controlled system, corresponding to the second output signal the first means provides as simulation of the third output signal as being produced by the controlled system;
    a digital error controller connected to the first and second means for receiving the second and third output signals and including means for the formation of error signals in response thereto and providing a train of fourth output signals in response to the error signals; and
    third means for combining the first and fourth output signals and feeding them to the input of the controlled system.

2. System as in claim 1, wherein the second output as input for the steering controller operates therein as an initial condition for calculating a train of first output signals upon change in the command signal.

3. System as in claim 1, the error controller including a summing point receiving the second and third output signals as analog signals, and including analog to digital conversion means, as well as digital to analog conversion means for the production of the fourth output signals.

4. System as in claim 1, the second means deriving plural different third output signals from different locations of the controlled system, the first means providing correspondingly plural, different, second output signals, the input of the digital error controller combining corresponding pairs of second and third signals, a pair defined by derivation from functionally corresponding locations in the controlled signal and the first means.

5. System as in claim 1, the steering controller receiving the second output signals as initial conditions for the calculations as performed by the steering controller.

6. System as in claim 5, the steering controller providing a train of output pulses for the initial condition and in response to each new command signal.

7. System as in claim 1, the first means providing approximation of transfer function and response time of the controlled system, the error controller providing operation offsetting the residual error as resulting from the approximation.

8. A system for causing a controlled system to follow a command in feedback configuration, the combination comprising:
    a simulator providing operation analogous to the controlled system;
    means defining a first feedback loop operating in response to the command as reference and including the simulator from which signals are derived, and digitally processed in conjunction with the reference and providing a first output for controlling the simulation;
    means defining a second feedback loop operating in response to said signals as derived from said simulator and operating in further response to signals derived from said controlled system for digitally processing said signals as so derived and providing a second output; and
    means for combining the first and second outputs and feeding them to the controlled system for control thereof.

* * * * *